(12) United States Patent
Post et al.

(10) Patent No.: US 8,519,677 B2
(45) Date of Patent: Aug. 27, 2013

(54) ELECTROSTATIC POWER HARVESTING

(75) Inventors: Ernest Rehmatulla Post, Cambridge, MA (US); Courtney Elaine Waal, Cambridge, MA (US)

(73) Assignee: Asteism, Inc., Cambridge, MA (US)

( * ) Notice: Subject to any disclaimer, the term of this patent is extended or adjusted under 35 U.S.C. 154(b) by 341 days.

(21) Appl. No.: 12/870,274

(22) Filed: Aug. 27, 2010

(65) Prior Publication Data

US 2011/0050181 A1    Mar. 3, 2011

Related U.S. Application Data

(60) Provisional application No. 61/237,528, filed on Aug. 27, 2009.

(51) Int. Cl.
*H02J 7/00* (2006.01)

(52) U.S. Cl.
USPC .......................................... 320/166; 320/128

(58) Field of Classification Search
USPC ......................................................... 320/166
See application file for complete search history.

(56) References Cited

U.S. PATENT DOCUMENTS

| | | | | |
|---|---|---|---|---|
| 4,422,013 | A * | 12/1983 | Turchi et al. | 315/111.81 |
| 5,790,392 | A * | 8/1998 | Eklund et al. | 363/49 |
| 7,592,783 | B1 * | 9/2009 | Jarvinen | 322/2 A |
| 2005/0110434 | A1 * | 5/2005 | Ballenger et al. | 315/307 |
| 2006/0267558 | A1 * | 11/2006 | Petz et al. | 320/166 |

* cited by examiner

*Primary Examiner* — Arun Williams
(74) *Attorney, Agent, or Firm* — Occhiuti Rohlicek & Tsao LLP

(57) ABSTRACT

An apparatus for supplying power includes an input port; a charge storage device for storing charge received through the input port; control circuitry configured to transfer charge from the charge storage device and to maintain a bias voltage at the input port; and an output port for delivering power from the control circuitry to a device.

10 Claims, 13 Drawing Sheets

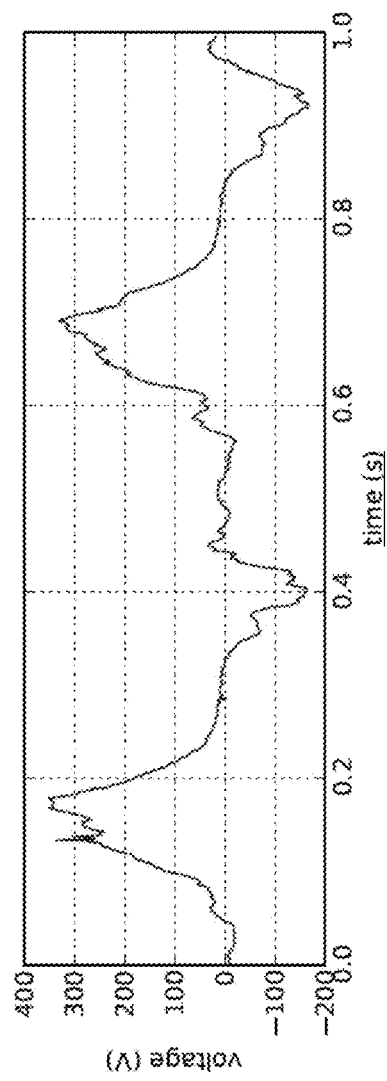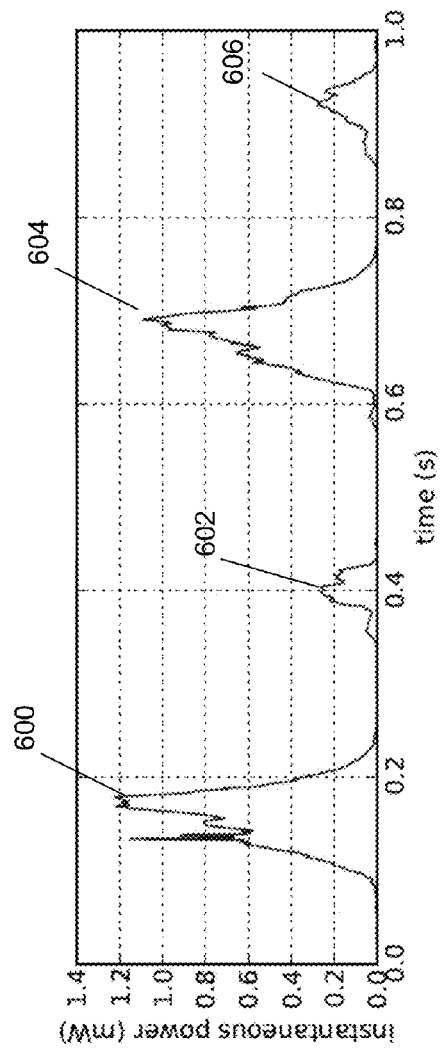
Fig. 6A
Fig. 6B

| | |
|---|---|
| (most positively charged) | Air |
| | Human skin, Leather |
| | Glass |
| | Human hair |
| | Nylon |
| | Wool |
| | Cat fur |
| | Silk |
| | Aluminum |
| | Paper |
| | Cotton |
| | Steel |
| | Wood |
| | Acrylic |
| | Polystyrene |
| | Rubber |
| | Nickel, Copper |
| | Silver |
| | Acetate, Rayon |
| | Styrofoam |
| | Polyurethane |
| | Polyethylene |
| | Polypropylene |
| | Vinyl (Polyvinylchloride (PVC)) |
| | Silicon |
| (most negatively charged) | Teflon (Polytrifluoroethylene (PTFE)) |

Fig. 11

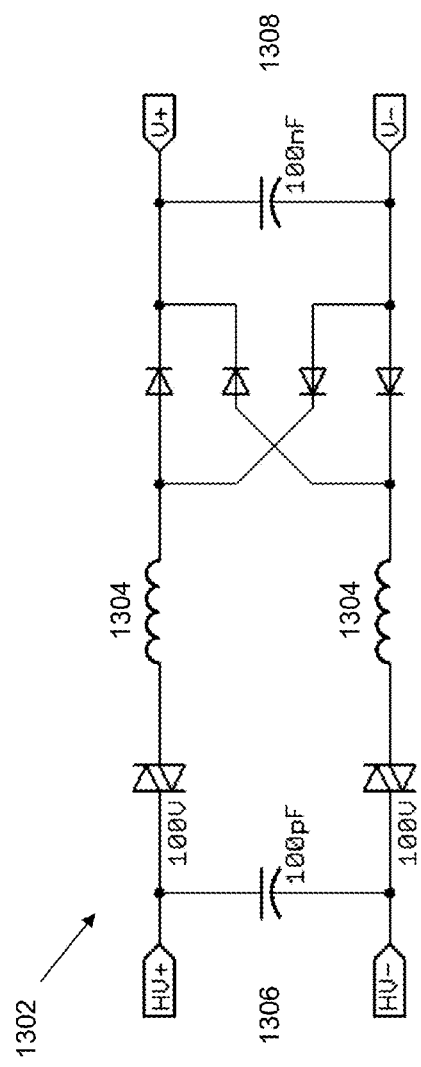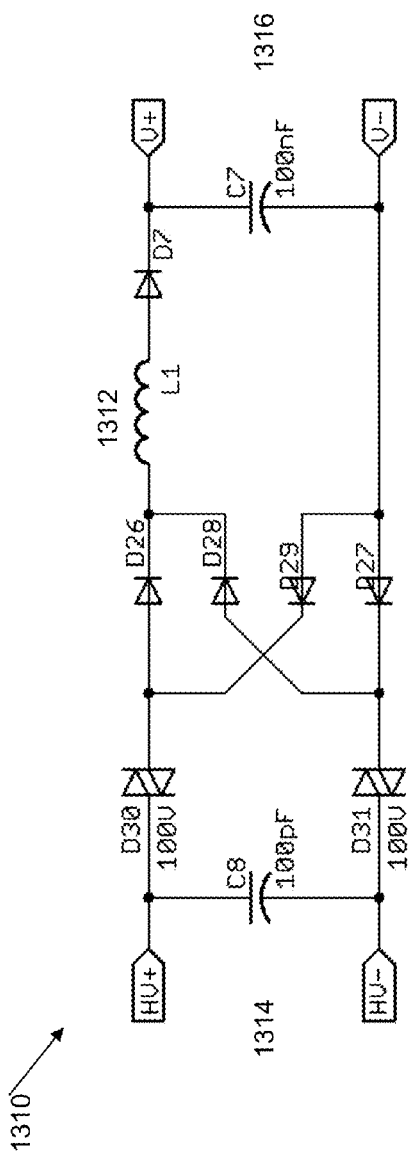

ELECTROSTATIC POWER HARVESTING

CROSS-REFERENCE TO RELATED APPLICATIONS

This application claims priority to U.S. Provisional Application Ser. No. 61/237,528, entitled "Electrostatic Power Harvesting for Material Computing" and filed on Aug. 27, 2009, the contents of which are incorporated herein by reference.

BACKGROUND

There is a general demand for effective and affordable renewable energy sources in many areas of computation and sensing. Interest in pervasive power has led to technological developments such as piezoelectric nanofibers, photovoltaic wires, and variable-capacitance generators, among other emerging technologies that are particularly well-suited to harvesting power from ambient energy sources. Pervasive power harvesting has applications in a broad variety of fields including medicine, defense, and consumer electronics. Power harvesting is particularly relevant to the rapidly growing field of electronic textiles (e-textiles), which has evolved from research curiosity into modular construction kits, but still operates using conventional power sources, rather than employing such novel energy sources.

SUMMARY

In a general aspect, an apparatus for supplying power includes an input port; a charge storage device for storing charge received through the input port; control circuitry configured to transfer charge from the charge storage device and to maintain a bias voltage at the input port; and an output port for delivering power from the control circuitry to a device.

Embodiments may include one or more of the following.

The apparatus further includes a power conversion unit connected to the control circuitry. The power conversion unit comprises a rectifier, such as a full-wave rectifier.

The charge storage device is for storing static charge. The charge storage device includes a capacitor.

The control circuitry is configured to accept charge from the charge storage device when the bias voltage at the input port exceeds a threshold voltage of the control circuitry. The control circuitry includes a trigger diode. The trigger diode comprises a DIAC (diode for alternating current).

The apparatus further includes a charge source connected to the input port. The charge source includes an electromechanical charge source. The charge source includes two materials, each material coupled to a terminal of the input port. The two materials are separated by a variable distance. The apparatus is configured to increase charge in the charge storage device when the distance between the two pieces of material is increased. The charge source further comprises an array of electrodes disposed on each material for coupling the materials to the terminals of the input port. The material includes a fabric. The material is a trioactive material.

The device is an electronic device.

In another general aspect, an apparatus for supplying power includes a garment including two types of fabric; a capacitor for storing charge generated by the garment; circuitry coupling each of the types of fabric to the capacitor; a threshold device connected to the capacitor and configured to accept charge stored on the capacitor when a voltage between the two pieces of fabric exceeds a threshold voltage of the threshold device; and an output port for delivering power from the threshold device to an electronic device.

Embodiments may include one or more of the following.

The apparatus further includes the electronic device configured to be powered via the output port.

The electronic device includes a light emitting diode. The electronic device includes a microcontroller. The electronic device includes a radio. More generally, the electronic device may include any electronic circuit or electric device that accepts electrical power to function.

The fabric comprises a trioactive material.

The garment includes an array of electrodes disposed on each piece of fabric.

In a further general aspect, a method for powering an electronic device includes maintaining a bias voltage across two terminals coupled to trioactive materials; accepting mechanically generated charge from the trioactive materials when a voltage across the terminals exceeds a threshold voltage greater than the bias voltage; storing the accepted charge in a charge storage device; converting charge in the charge storage device to a voltage suitable for powering the electronic device; and passing current at the converted voltage to the electronic device.

Embodiments may include one or more of the following.

Accepting mechanically generated charge comprises accepting mechanically generated static charge.

The method further includes matching an impedance of the two terminals coupled to the trioactive materials with an impedance of circuitry for accepting the mechanically generated charge. In some cases, the impedance is matched using an inductive network or a switched-mode power supply.

The systems and methods described herein have a number of advantages. The power harvesting technique utilized exploits electrostatic energy, which is a tangible source of power, and is compatible with electronic textiles (e-textiles) and other forms of material computing. This technique arises from a paradigm shift in which designers can view e-textiles as programmable interactive media that can be cut to fit an application, rather than as mere substrates for application-specific circuitry. A modular, scalable architecture can be created that addresses fundamental issues of communication, sensing, and power distribution in e-textiles.

Combining a multi-mode mechanically-driven charge pump with a triboelectric charge source achieves higher conversion efficiency than would be possible with either approach alone. Implementing this power harvesting technique in a wearable form allows power to be recovered from the wearer's motion. More generally, power can be harvested from multiple modes of motion, including surfaces sliding over one another as well as surfaces moving together and apart.

Devices implementing the power harvesting techniques described herein can be fabricated easily using methods and materials readily available to designers and artists and can be made to operate at low voltage. In the case of garments, the devices can be fabricated to conform to a variety of flexible, wearable geometries.

The methods and systems described herein improve upon the present practice of variable-capacitance and other electrostatic generators in several crucial ways. First, variable-capacitance generators are typically restricted to a single degree of freedom of movement; the present apparatus and methods use a multiplicity of electrodes to allow charge induction from relative motion of the two surfaces in all three axes. Second, variable-capacitance generators typically require an initial, external bias source to operate; in the present apparatus and methods the initial bias is provided by the tribocharging that occurs due to interaction of the surfaces. Third, variable-capacitance generators are typically operated in a mechanically-resonant mode or set of modes, and therefore only receive mechanical energy at specific frequencies; the present apparatus and methods are not restricted to a fixed set of resonant modes.

Other features and advantages of the invention are apparent from the following description and from the claims.

BRIEF DESCRIPTION OF DRAWINGS

FIGS. 6A and 6B are plots of the voltage and power outputs, respectively, of the prototype skirt panel of FIG. 5.

FIG. 11 is an exemplary triboelectric series.

FIGS. 13A and 13B are schematic diagrams of alternative embodiments of energy harvesting circuits.

DETAILED DESCRIPTION

The phenomenon of triboelectricity, or contact electrification, occurs when nearly any combination of metal (conductor), semiconductor, or dielectric (insulator) materials come into contact. The electrostatic interactions between two materials can be estimated from their relative positions in a so-called triboelectric series, as shown in FIG. 11. The position of a given material within the series represents its (empirically determined) tendency to accept charge from contact with other materials in the series. The further apart two materials are in the series, the more charge will be transferred between them during contact.

While useful, the notion of a triboelectric series is not without its shortcomings. For one, it is not always possible to arrange a group of materials into a triboelectric series. For instance, it has been found that silk charges glass negatively, glass charges zinc negatively, and zinc charges silk negatively, so these three materials form a triboelectric "ring" rather than a series. Furthermore, triboelectric series obtained in different studies are often found to be in disagreement.

Figure 1:
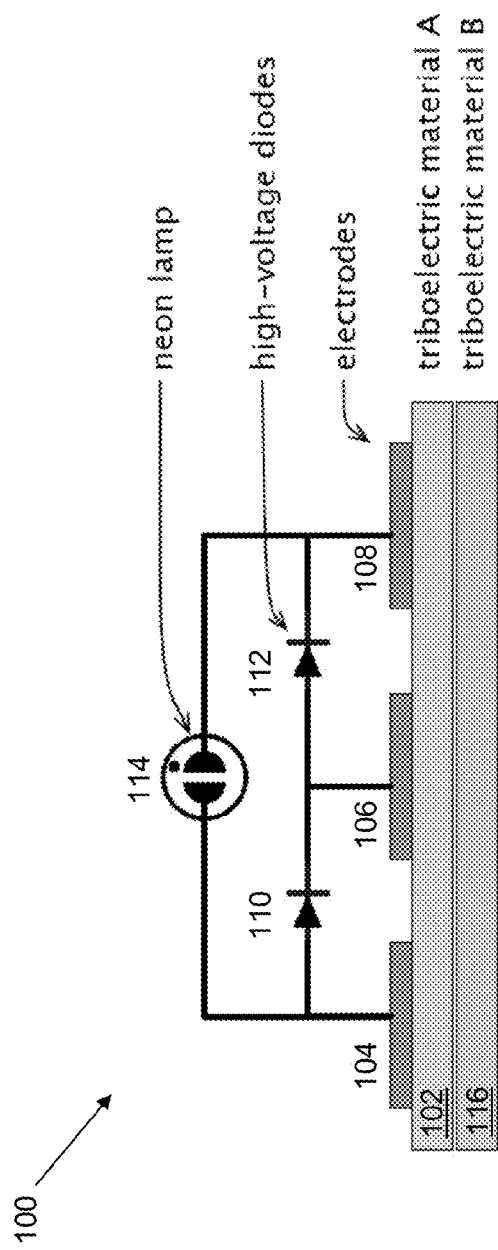
FIG. 1 is a schematic diagram of a triboelectric testing paddle.

Referring to FIG. 1, a triboelectric testing paddle 100 is a cardboard panel 102 on which are affixed three copper foil electrodes 104, 106, and 108; two diodes 110 and 112; and a neon bulb 114. The electrodes 104, 106, 108 are covered with a first triboelectric material (denoted "triboelectric material A") and the paddle 100 is rubbed against a sample of another triboactive material 116 (denoted "triboelectric material B").

Figure 2:
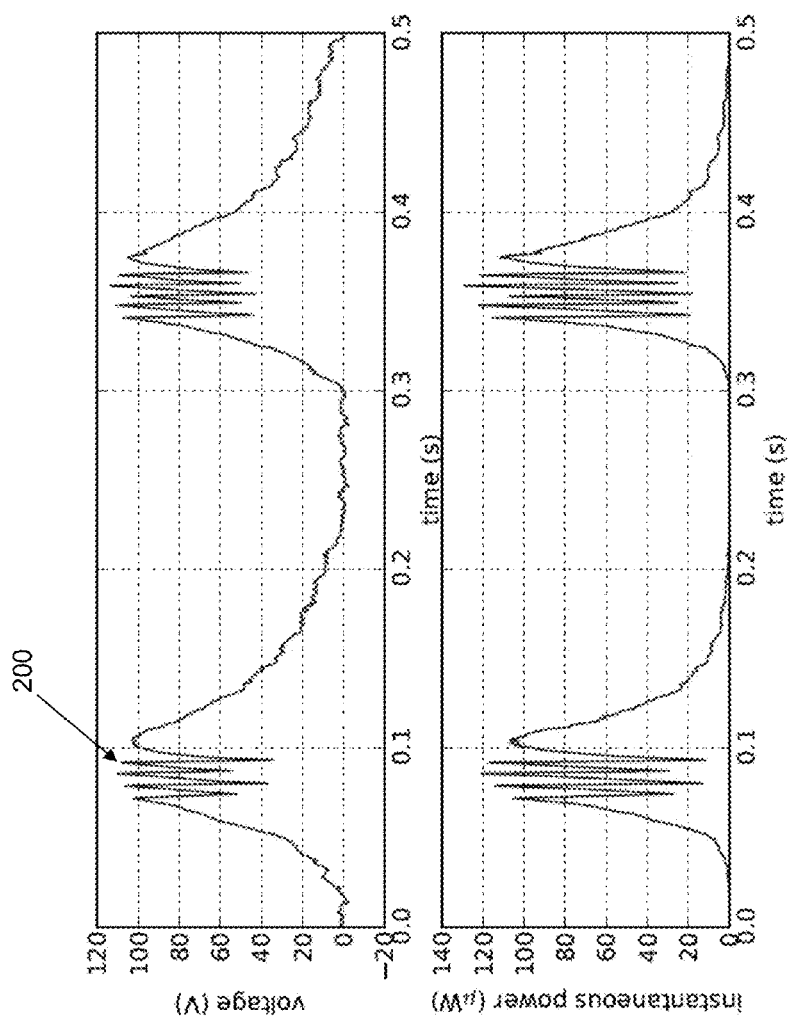
FIG. 2 is a plot of the voltage and power outputs, respectively, resulting from relative motion between a nylon triboelectric testing paddle and a PTFE triboelectric testing paddle.

The operating principle of the triboelectric testing paddle 100 is similar to that of a variable capacitance generator: diodes 110, 112 allow charge to flow preferentially in one direction across the electrodes, developing a voltage difference across pairs of electrodes. When the breakdown voltage of lamp 114 (typically 100V) is exceeded, a discharge occurs, the lamp lights, and the voltage across the electrode array drops temporarily. Referring to FIG. 2, this effect can be seen as a series of spikes 200 as the lamp 114 discharges multiple times in response to back-and-forth sliding of a polytetrafluoroethylene (PTFE) test paddle over a nylon test paddle at a frequency of about 4 Hz. Charging occurs only for relative motion in one direction. Each charging event has an average energy of 5.6 µJ and the average output power is 22.5 µW.

When two testing paddles 100 are brushed rapidly against each other, there is a net charge transfer that is stored in the more insulating surface. For instance, PTFE is an excellent insulator with a surface resistivity of greater than $10^{18}$ Ω/square and a high dielectric strength of 18 V/µm. Charge deposited on a PTFE surface will remain immobile and virtually undiminished for hours.

The maximum surface charge density that will be stabilized on the PTFE surface can be derived from the dielectric strength of air (3 V/µm) and the definition of surface charge density ($\sigma = \in E$) to give $\sigma_{max} = \in_{air} E_{breakdown} = (8.85 \times 10^{-12}$ F/m)$(3 \times 10^6$ V/m)$= 2.7 \times 10^{-5}$ C/m². At this point, the electric field strength at the surface is sufficient to ionize the surrounding air. The surface charge will decrease when oppositely-charged ions are attracted and recombination occurs while similarly-charged ions are repelled from the surface. This effective current flow through air is known as corona discharge and can be observed by rubbing PTFE and nylon testing paddles together briefly to build up a charge and then slowly pulling them apart. As the paddles separate, a faint crackling will be heard, indicating corona discharge. Thus, the surface charge density on the insulating surface of a paddle can be expected to be on the order of $\sigma_{max}$.

Because charge is stable for a relatively long time on the dielectric surface, the testing paddle may be thought of as a self-biasing charge pump which harvests energy from motion, or alternatively as a type of variable-capacitance generator biased by triboelectric charging instead of by an external source.

Figure 3:
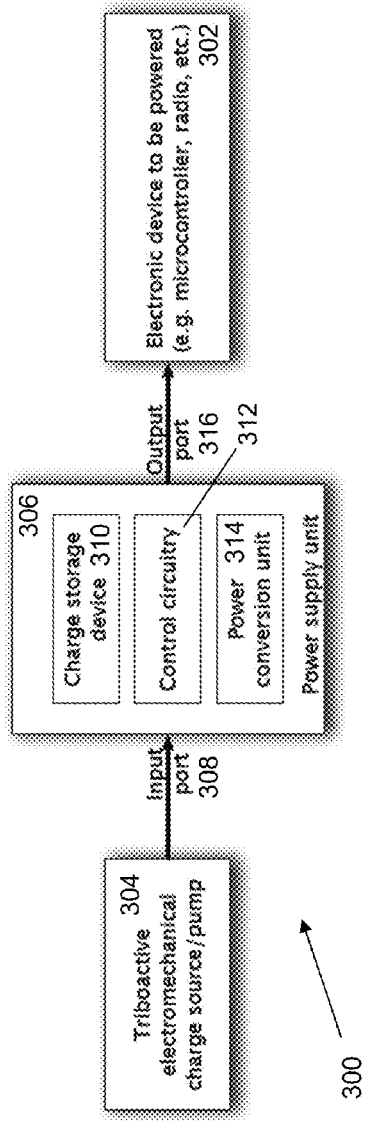
FIG. 3 is a block diagram of an energy harvesting system.

Referring to FIG. 3, an energy harvesting system 300 based on triboelectric phenomena can be used to power an electronic device 302, such as a light-emitting diode (LED) display, a microcontroller, a radio, or another device. In system 300, a triboactive electromechanical charge source or pump 304 is used to supply charge to a power supply unit 306 via an input port 308. In power supply unit 306, a charge storage device 310 stores static charge received from the charge source 304, e.g., in a capacitor. Control circuitry 312 in the power supply unit 306 directs the transfer of charge from charge storage device 310 through a power conversion unit 314, such as a full-wave rectifier, where the charge is converted into a voltage. Current at the converted voltage is passed via an output port 316 to the electronic device 302. In some embodiments, a trigger diode, such as a diode for alternating current (DIAC) in control circuitry 312 causes the control circuitry to accept charge from charge storage device 310 when the bias voltage at input port 308 exceeds a threshold voltage of the trigger diode.

In a specific implementation of an energy harvesting system, a wearable energy harvesting system in the form of a skirt lights up due to its own motion, displaying the wearer's ongoing level of physical activity by powering strings of LEDs using only the energy generated in the garment's motion. To select appropriate fabrics for use in the energy harvesting skirt, the testing paddle 100 of FIG. 1 was used to assay the triboelectric properties of a variety of fabrics. Fabrics were tested using both tribopositive (nylon-coated) and tribonegative (PTFE-coated) paddles. Results identified rip-stop nylon, vinyl, latex rubber, and 0.003" PTFE film as potential fabrics for incorporation into the energy harvesting skirt. Rip-stop nylon is commonly available in a variety of stiffnesses ranging from less than 1 oz/yard² to heavy-duty pack fabrics designed to be used in highly abrasive environments. In a rip-stop fabric, a grid of crossing heavy fibers keeps tears from spreading. Furthermore, the fabric often has a shiny side and a rough side due to asymmetric calendaring, allowing the skirt designer a choice of surface texture. However, technical fabrics such as rip-stop nylon are often coated with a durable water repellent, which allows water to bead off the surface while maintaining the breathability of the fabric. Many of these water repellants contain Teflon®, which can complicate the triboelectric relationships between the rip-stop fabric and other materials. Additionally, in some cases, further testing of the selected fabrics was performed because, even if a fabric is known to be highly tribopositive or tribonegative, highly textured surfaces may not slip well against each other and thus may reduce power generation.

Figure 4:
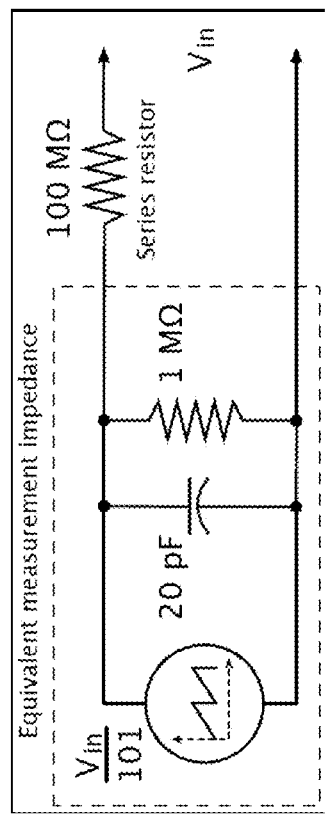
FIG. 4 is a schematic diagram of high voltage measurement circuitry.

Referring to FIG. 4, to estimate the available power, the output voltage was measured through a 100 MΩ series resistance using a Picoscope 2104 USB oscilloscope with a 1 MΩ input impedance forming a 1:101 voltage divider and giving an effective probe gain of approximately 1:100. Instantaneous power was then calculated as $P(t)=(V(t))^2/(101 \text{ M}\Omega)$.

Figure 5A:
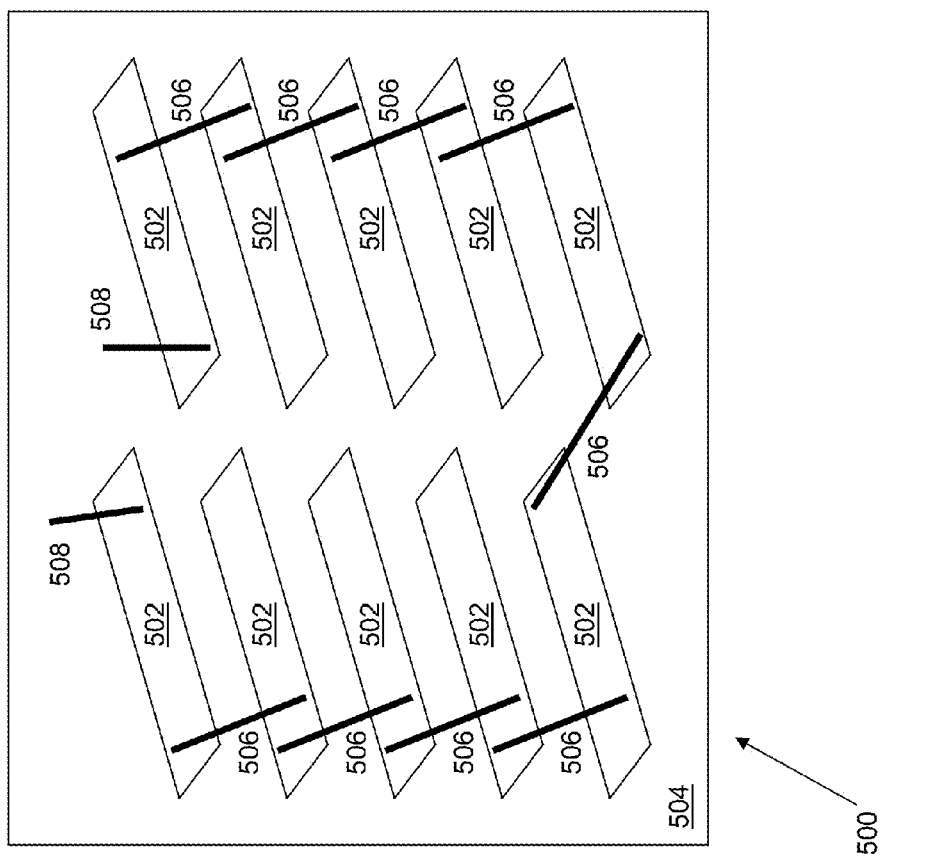
FIG. 5A is a diagram of a prototype panel of an energy harvesting skirt.

Referring to FIG. 5A, a prototype panel 500 of an energy harvesting skirt employs an electrode-and-diode ladder circuit such as the circuit in testing paddle 100 (FIG. 1), but extended to ten electrodes 502. Textiles were substituted for the substrate and electrodes of the testing paddle. Applique and piecework techniques were used to attach the electrodes, diodes, and terminals to substrate fabric 504. In the example shown in FIG. 5, electrodes 502 dimensioned approximately 2.5 cm×10 cm were cut out of conductive organza and affixed to nylon substrate 504 (approximately 1 ft×2 ft) using spray fabric adhesive. Diodes were soldered to sections of copper braid 506 and sewn across the organza electrodes 502. Two additional sections of copper braid 508 were sewn to the terminal electrodes to allow connection to external circuitry.

Figure 5B:
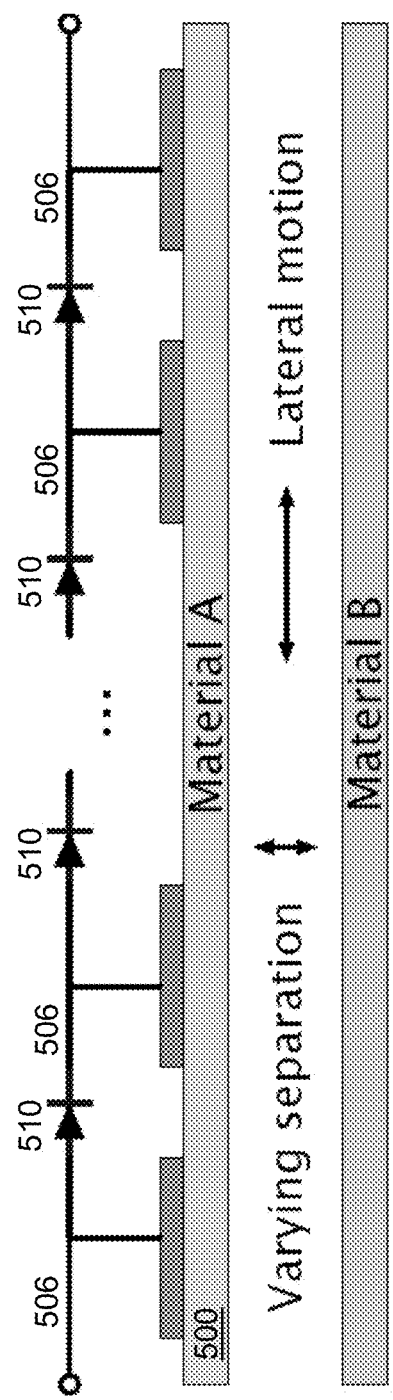
FIG. 5B is schematic depiction of the circuitry in the prototype panel shown in FIG. 5A.

Referring to FIG. 5B, a schematic depiction of the circuitry in prototype panel 500 is shown. A diode 510 on each section of copper braid 506 connects two adjacent organza electrodes 502. Relative motion between panel 500 and another material 512 (Material B) through either lateral motion or varying separation induced triboelectric power generation.

Referring to FIGS. 6A and 6B, power measurements were performed using a 1:101 probe gain and a 101 MΩ loading. A 16 cm×16 cm square of PTFE was rubbed lightly back and forth across the vertical centerline of the prototype skirt panel 500 (FIG. 5) at a frequency of about 2 Hz and the output voltage was monitored directly. Four charging events 600, 602, 604, 606 were observed (FIG. 6B), and a strong asymmetry is visible in the output voltage (FIG. 6A) due to the diode ladder. The average output power over a 1 second interval is 162.2 µW.

Figure 7:
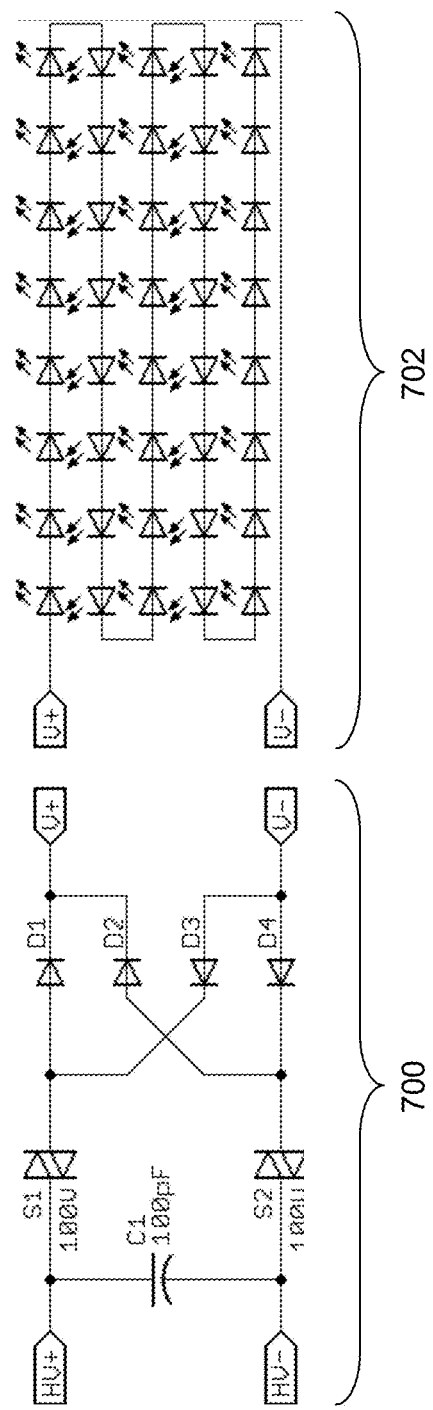
FIG. 7 is a schematic diagram of an energy harvesting circuit and an LED display.

Referring to FIG. 7, an energy harvesting circuit 700 and a multiple LED display 702 were integrated into the energy harvesting skirt. Diacs S1 and S2 maintain a bias voltage between 100 V and 200 V across the array of electrodes 502 on the skirt panel (FIG. 5), and a capacitor C1 provides a 100 pF charge reservoir. Diodes D1-D4 form a full-wave rectifier that drives the string of LEDs 702. By connecting 40 red LEDs in series, each with a nominal forward voltage of $V_f \approx 2$ V, the stepping down of the output voltage ($V_{out} \approx 100$ V) can be avoided. The bias across electrodes 502 is maintained such that charge remains on the electrodes, which allows a voltage (and thus power) to be generated in response to a relative motion between the energy harvesting circuit 700 and another triboelectric material.

Figure 8B:
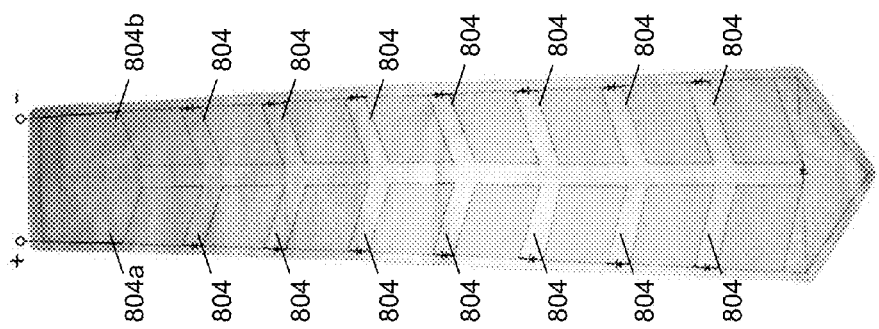
FIG. 8B is a diagram of a single panel of the energy harvesting skirt of FIG. 8A.
Figure 8A:
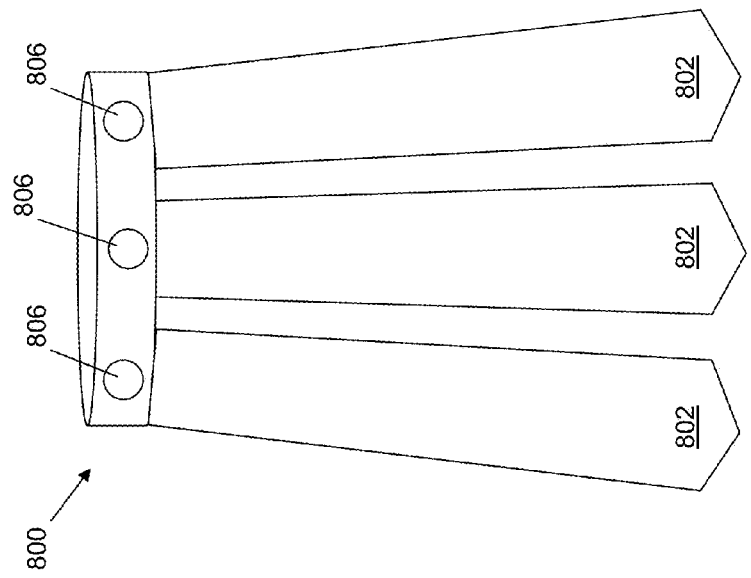
FIG. 8A is a diagram of an energy harvesting skirt.

Referring to FIGS. 8A and 8B, an energy harvesting skirt 800 includes six pairs of triboelectric panels 802 (only three are shown). When the panels in each pair rub against each other, an electric charge is generated, collected, and converted to power. Rip-stop nylon was used for the both the electrode substrate and the outer covering. The diode/electrode ladder pattern of the prototype (e.g., FIGS. 5 and 7) was extended to a total of 16 electrodes 804 with a total area of about 156 in² (about 0.1 m²). Terminal electrodes (+ and −) 804a, 804b were fabricated of folded conductive organza to make robust sewable attachments. The layout of the electrodes is optimized to maximize the number and area of the electrodes and to minimize the distance traveled between electrodes (e.g., by avoiding non-consecutive placement or criss-crossing of circuit paths). In some embodiments, the pattern of electrodes may also serve as a decorative element. In general, patterns can be cut using a variety of techniques and may be free-form provided a suitable connection point to further electronics is allotted.

The inner panel of each pair of panels 802 is made of two layers of 0.003" PTFE sandwiched around a layer of conductive organza. The organza was first stabilized by hemming the edges and then affixing to one sheet of PTFE with spray adhesive. The second PTFE sheet was then added and a whip-stitch hem was placed around the edge. Care was taken not to allow the needle or thread to crack the PTFE. Weight-bearing seams across the top of the panel were reinforced with stiff interfacing. The outer panel is formed of two layers of nylon sandwiched around metallic organza electrodes arranged to collect charge transferred between the two panels during contact, separation, and/or sliding motion.

Electrodes can be glued onto a backing fabric as long as the glue does not fully encase the areas of the electrode contacting the triboactive surface. Such a design has the added benefit of minimizing fraying, which can be a source of electrical shorts. Each of the six tribogenerator panel pairs 802 attaches by fabric snaps to its own circular power harvesting circuit and LED display 806 (referred to as a medallion). The difference in the amount of motion experienced by each panel of the skirt is visible as a difference in brightness and frequency of flashes of light from the corresponding medallion 806. Medallions 806 were fabricated on single-sided 0.010" FR4 PCB stock using a toner transfer and chemical etch process.

Figure 9:
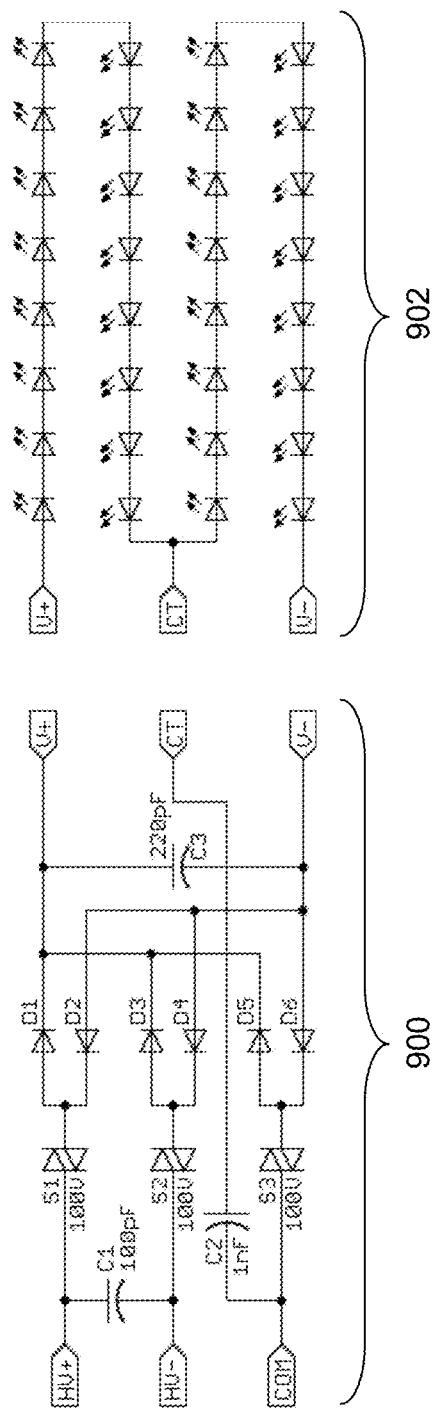
FIG. 9 is a schematic diagram of an energy harvesting circuit and LED display circuitry.

Referring to FIG. 9, a schematic of an energy harvesting circuit 900 and the LED circuitry 902 in medallion 806 is shown. While the HV+ and HV− terminals are attached to either side of the electrode-diode ladder of energy harvesting circuit 900, a third common terminal (COM) has been added to connect to the conductive fabric ground plane in the PTFE panel. Bias is maintained at around 100 V by diacs S1-S3, and diodes D1-D6 form a three-phase full-wave rectifier. A capacitive link connects the common terminal COM to the center of the LED circuitry 902. The common ground planes of the six generators are connected to shield the wearer from unintentional charging and discharge.

The inclusion of common terminal COM in energy harvesting circuit 900 and LED circuitry 902 allows three distinct charging events to be displayed. When the voltage across the electrode array causes any pair of diacs to conduct, the entire string of LEDs in LED circuitry 902 (from V+ to V− terminals) lights up. Furthermore, as the pair of panels 802 separate and come together, the pair acts as a variable-capacitance generator and lights up alternate halves of the LED string (from V+ to CT or from CT to V−) according to the direction of current flow.

Figure 10:
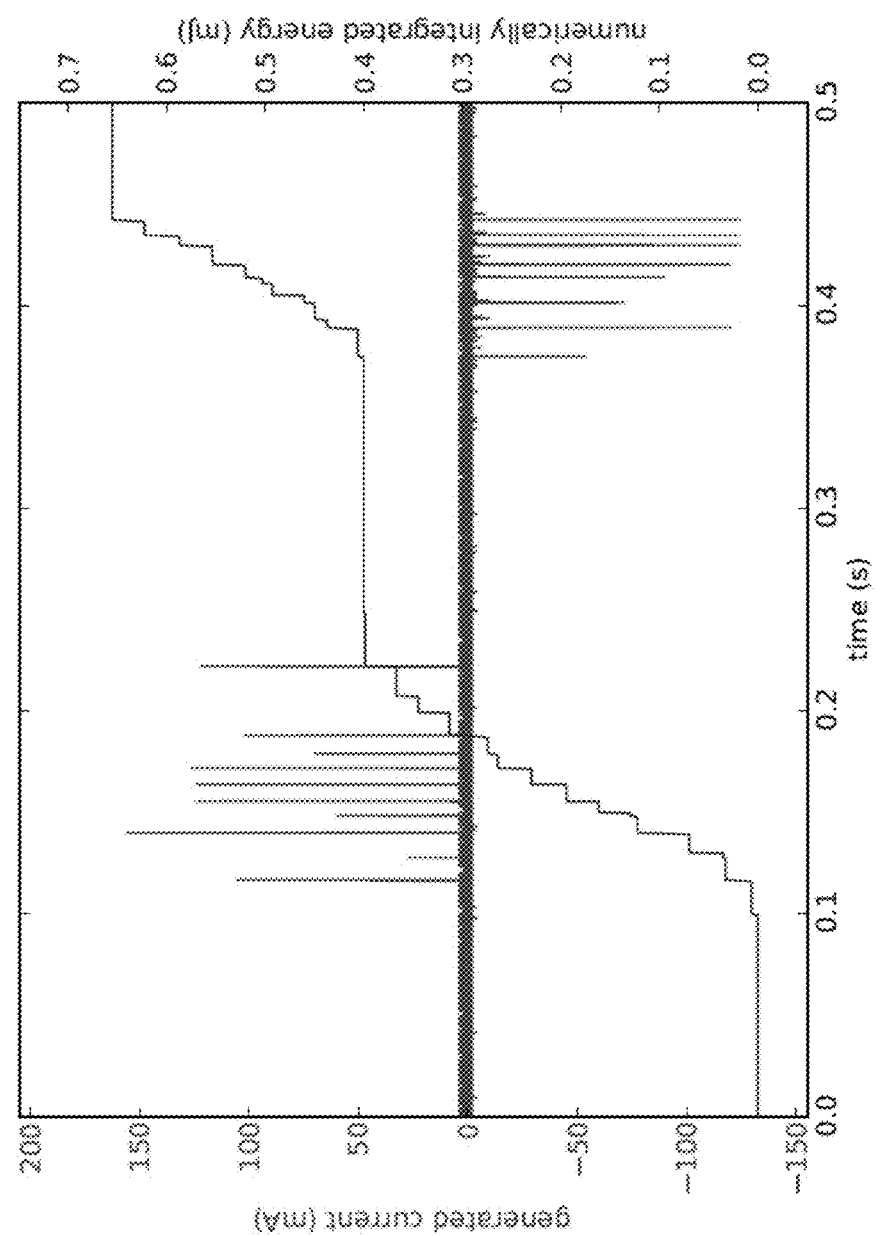
FIG. 10 is a plot of the current response during a charging event in a panel of the energy harvesting skirt of FIG. 8A.

The performance of the energy harvesting circuit 900 was performed by measuring the voltage drop across a 1 kΩ resistor inserted between the CT terminals shown in FIG. 9. Referring to FIG. 10, a typical charging cycle is shown as the inner and outer panels of the pair of panels 802 are separated by 1 cm and then brought back into contact. The measured current through the load resistor was converted to a power measurement and numerically integrated to arrive at a total energy of 657 µJ per charging cycle, or an average power of 1.3 mW under test conditions. Furthermore, repeated cycling of the energy harvesting skirt (3 front-to-back motions in 2 seconds through a total arc of about 10 degrees, followed by a pause of 1 second) over a period of twelve weeks, for an estimated 50,000 cycles, did not degrade the performance or the structural integrity of the skirt, demonstrating its durability and longevity.

Figure 12:
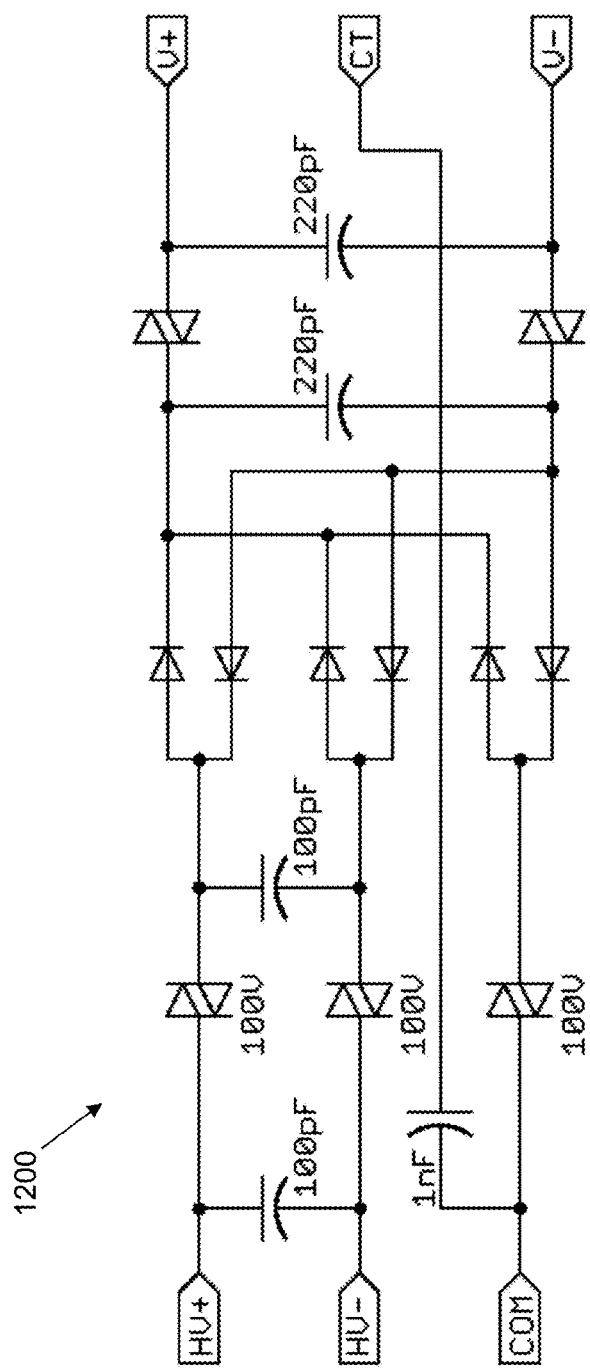
FIG. 12 is a schematic diagram of an alternative embodiment of an energy harvesting circuit.

Referring to FIG. 12, an alternative embodiment of a non-inductive power harvesting circuit 1200 employing the concepts described above is shown.

Referring to FIG. 13A, in an alternative embodiment of a power harvesting circuit 1302, inductive elements 1304 are employed to enable impedance matching between a source 1306 and a load 1308. Referring to FIG. 13B, in another configuration of a power harvesting circuit 1310, an inductive element 1312 enables impedance matching between a source 1314 and a load 1316.

The power harvesting techniques described above are not limited to fabrication in clothing and may be applied to many other media including packaging, enclosures, print media, carpeting, building construction media, and other materials.

In some alternative embodiments, semi-passive mechanical actuation may be achieved by selectively harvesting energy from a system's motion in order to cause it to slip and stick as desired.

In some cases, the output power may be converted to a voltage compatible with standard low-power electronics. In other cases, design adjustments may be made to optimize triboelectric charging and electrostatic induction.

In some embodiments, the non-linear charge pump components (e.g., the diodes) are implemented as all-fabric or printed structures. Alternatively, semiconductor packages compatible with fabric systems may be used for the non-linear charge pump components.

In an alternative embodiment, power is generated by measuring distance capacitively and transmitting through the body to the power harvesting garment.

It is to be understood that the foregoing description is intended to illustrate and not to limit the scope of the invention, which is defined by the scope of the appended claims. Other embodiments are within the scope of the following claims.

What is claimed is:

1. An apparatus for supplying power, comprising:
   a garment including two types of fabric;
   a capacitor for storing charge generated by the garment;
   circuitry coupling each of the types of fabric to the capacitor;
   a threshold device connected to the capacitor and configured to accept charge stored on the capacitor when a voltage between the two pieces of fabric exceeds a threshold voltage of the threshold device; and
   an output port for delivering power from the threshold device to an electronic device.

2. The apparatus of claim 1, wherein the apparatus further comprises the electronic device configured to be powered via the output port.

3. The apparatus of claim 2, wherein the electronic device includes a microcontroller.

4. The apparatus of claim 2, wherein the electronic device includes a radio.

5. The apparatus of claim 1, wherein the electronic device includes a light emitting diode.

6. The apparatus of claim 1, wherein the fabric comprises a trioactive material.

7. The apparatus of claim 1, wherein the garment includes an array of electrodes disposed on each piece of fabric.

8. A method for powering an electronic device comprising:
   maintaining a bias voltage across two terminals coupled to trioactive materials;
   accepting mechanically generated charge from the trioactive materials when a voltage across the terminals exceeds a threshold voltage greater than the bias voltage;
   storing the accepted charge in a charge storage device;
   converting charge in the charge storage device to a voltage suitable for powering the electronic device; and
   passing current at the converted voltage to the electronic device.

9. The method of claim 8, wherein accepting mechanically generated charge comprises accepting mechanically generated static charge.

10. The method of claim 8, further comprising matching an impedance of the two terminals coupled to the trioactive materials with an impedance of circuitry for accepting the mechanically generated charge.

\* \* \* \* \*